(12) United States Patent
Chakrabarti et al.

(10) Patent No.: US 9,340,430 B2
(45) Date of Patent: May 17, 2016

(54) CRYSTALLINE GRAPHENE AND METHOD OF MAKING CRYSTALLINE GRAPHENE

(75) Inventors: Amartya Chakrabarti, Hoffman Estates, IL (US); Narayan S. Hosmane, DeKalb, IL (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 0 days.

(21) Appl. No.: 14/001,845

(22) PCT Filed: Dec. 6, 2011

(86) PCT No.: PCT/US2011/063548
§ 371 (c)(1),
(2), (4) Date: Dec. 19, 2013

(87) PCT Pub. No.: WO2013/036272
PCT Pub. Date: Mar. 14, 2013

(65) Prior Publication Data
US 2014/0193575 A1    Jul. 10, 2014

Related U.S. Application Data

(60) Provisional application No. 61/533,045, filed on Sep. 9, 2011.

(51) Int. Cl.
| | | |
|---|---|---|
| *C01B 31/04* | (2006.01) | |
| *C09D 11/00* | (2014.01) | |
| *C09D 11/52* | (2014.01) | |
| *B82Y 30/00* | (2011.01) | |
| *B82Y 40/00* | (2011.01) | |

(52) U.S. Cl.
CPC ............ *C01B 31/0492* (2013.01); *B82Y 30/00* (2013.01); *B82Y 40/00* (2013.01); *C01B 31/04* (2013.01); *C01B 31/0446* (2013.01); *C09D 11/52* (2013.01)

(58) Field of Classification Search
CPC  C01B 31/04; C01B 31/0446; C01B 31/0492; B82Y 40/00; B82Y 30/00; C09D 11/52
USPC ............................ 423/448; 427/122; 252/502
See application file for complete search history.

(56) References Cited

U.S. PATENT DOCUMENTS

| | | | |
|---|---|---|---|
| 4,080,715 | A | 3/1978 | Yoshida et al. |
| 4,873,071 | A | 10/1989 | Yamada et al. |
| 4,946,370 | A | 8/1990 | Yoshimoto et al. |
| 5,143,709 | A | 9/1992 | Labes |

(Continued)

FOREIGN PATENT DOCUMENTS

| | | |
|---|---|---|
| AU | 70929/74 | 8/1976 |
| TW | 2013/11553 | 4/2013 |

(Continued)

OTHER PUBLICATIONS

European Search Report dated Jan. 5, 2015 for EPC application No. 11806019.3-1355, 9 pages.

(Continued)

*Primary Examiner* — Daniel C McCracken
(74) *Attorney, Agent, or Firm* — Evan Law Group LLC (57) ABSTRACT

A method of producing graphene comprises forming a composition comprising magnesium and carbon, and isolating graphene from the composition. The isolated graphene is crystalline.

31 Claims, 8 Drawing Sheets

(56) References Cited

U.S. PATENT DOCUMENTS

| | | | |
|---|---|---|---|
| 5,149,518 | A | 9/1992 | Mercuri et al. |
| 5,419,889 | A | 5/1995 | Matsumoto et al. |
| 5,472,749 | A | 12/1995 | Dravid et al. |
| 6,939,526 | B2 | 9/2005 | Fukuda et al. |
| 7,097,788 | B2 | 8/2006 | Kirkor et al. |
| 8,377,408 | B2 | 2/2013 | Dickinson, III et al. |
| 8,420,042 | B2 | 4/2013 | Dickinson et al. |
| 2009/0110627 | A1 | 4/2009 | Choi et al. |
| 2010/0000441 | A1 | 1/2010 | Jang et al. |
| 2010/0301212 | A1 | 12/2010 | Dato et al. |
| 2010/0301279 | A1 | 12/2010 | Nesper et al. |
| 2010/0303706 | A1 | 12/2010 | Wallace et al. |
| 2010/0323113 | A1 | 12/2010 | Ramappa et al. |
| 2011/0030879 | A1 | 2/2011 | Veerasamy |
| 2011/0030991 | A1 | 2/2011 | Veerasamy |
| 2011/0033688 | A1 | 2/2011 | Veerasamy |
| 2011/0091647 | A1 | 4/2011 | Colombo et al. |
| 2011/0114499 | A1 | 5/2011 | Hori et al. |
| 2011/0171427 | A1 | 7/2011 | Kim et al. |
| 2011/0256049 | A1 | 10/2011 | Dickinson, III et al. |
| 2012/0068124 | A1* | 3/2012 | Dickinson ............... B82Y 30/00 252/509 |

FOREIGN PATENT DOCUMENTS

| | | |
|---|---|---|
| WO | 2012/040303 | 3/2012 |
| WO | 2013/036272 | 3/2013 |

OTHER PUBLICATIONS

Chakrabarti, A. et al., "Conversion of carbon dioxide to few-layer graphene", Journal of Materials Chemistry, vol. 21, pp. 9491-9493, (2011).

Osetzky, D., "Macrocrystalline graphite from magnesium carbide", Carbon, vol. 12, issue 5, pp. 517-523, (1974).

Dai, C. et al., "Synthesis of nanostructured carbon by chlorination of calcium carbide at moderate temperatures and its performance evaluation", Materials Chemistry and Physics, vol. 112, No. 2, pp. 461-465, (2008).

Feldhoff, A. et al., "Structure and composition of ternary carbides in carbon-fibre reinforced Mg—Al alloys", Philosophical Magazine A, vol. 79, No. 6, pp. 1263-1277, (1999).

Novoselov, K.S. et al., "Two-dimensional atomic crystals", Proceedings of the National Academy of Sciences, vol. 102, No. 30, pp. 10451-10453, (2005).

Moskvitch, K., "Graphene technology moves closer", BBC News Technology, found at www.bbc.co.uk/news/technology-13886438?print=true, 5 pages, printed on Jul. 6, 2011.

Wu, Z. et al., "Transparent, conductive carbon nanotube films", Science, vol. 305, No. 5688, pp. 1273-1276, (2004).

Torrisi, F. et al., "Ink-jet printed graphene electronics", ACS Nano, vol. 6, No. 4, pp. 2992-3006, (2012).

Pumera, M., "Graphene in biosensing", Materials Today, vol. 14, No. 7-8, pp. 308-315, (2011).

Green, A.A., et al., "Colored semitransparent conductive coatings consisting of monodisperse metallic single-walled carbon nanotubes", Nano Letters, vol. 8, No. 5, pp. 1417-1422, (2008).

MRS Bulletin, "Graphene and other materials highlighted at 2010 Materials Research Society Fall Meeting", MRS Bulletin, vol. 36, pp. 552-563, (2011).

Biswas, M.M., "Energy Focus: Graphene nanosheet supercapacitor achieved high-frequency ac circuit-filtering capacity", MRS Bulletin, vol. 35, p. 944, (2010).

"Bio Focus: Graphene serves as trans-electrode membrane for DNA molecules", MRS Bulletin, vol. 35, pp. 735-736, (2010).

Njoroge, J.L., "Nano Focus: Novel method developed to fabricate graphene-on-organic film", MRS Bulletin, vol. 36, pp. 244-245, (2011).

Trohalaki, S., "Nano Focus: Novel method developed to grow graphene on low reactivity metals", MRS Bulletin, vol. 36, pp. 835-837, (2011).

Palucka, T., "Nano Focus: Self-cooling observed in graphene electronics", MRS Bulletin, vol. 36, p. 330, (2011).

Trohalaki, S., "Nano Focus: Perspectives provided on graphene for electronic and photonic devices", MRS Bulletin, vol. 35, p. 943, (2010).

Fuhrer, M.S. et al., "Graphene: Materially better carbon", MRS Bulletin, vol. 35, pp. 289-295, (2010).

Knieke, C. et al., "Graphene Production With Stirred Media Mills", MRS Proceedings, vol. 1259, Symposium S, PROC-1259-S12-01, 4 pages, (2010).

Schoen, D.T. et al., "High speed water sterilization using one-dimensional nanostructures", Nano Letters, vol. 10, No. 9, pp. 3628-3632, (2010).

Lu, Y. et al., "DNA-decorated graphene chemical sensors", Applied Physics Letters, vol. 97, No. 8, 7 pages, (2010).

Crassee, I. et al., "Giant Faraday rotation in single- and multilayer graphene", Nature Physics, Advance Online Publication, pp. 1-4, (2010).

"Skin-like, transparent sensors can stretch to twice their original size", Materials Research Society, 2 pages, found at www.mrs.org/article.aspx?id=2147488441, printed on Nov. 28, 2011.

"Graphene yields giant Faraday rotation", Materials Research Society, 1 page, printed on Nov. 28, 2011.

Ahlberg, L., et al., "Self-cooling observed in graphene electronics", News Bureau, University of Illinois, 2 pages, printed on Nov. 28, 2011.

Grosse, K.L. et al., "Nanoscale Joule heating, Peltier cooling and current crowding at graphene-metal contacts", Nature Nanotechnology, vol. 6, pp. 287-290, supplemental pp. 1-10, (2011).

Louie, R., "Chemically modified graphene stars as new electrode material in ultracapacitor cell", MRS Bulletin, vol. 33, p. 1133, (2008).

Radoi, A. et al., "Ultrabroadband photodetection based on graphene ink", Nanotechnology, vol. 21, No. 45, pp. 1-6, (2010).

"Scientists find simple way to produce graphene", ScienceDaily, 2 pages, found at www.sciencedaily.com/releases/2011/06/11 06 20161308.htm?utm_source=rss1.0&utm_medium=feed&utm_campaign=feed%3A+sciencedaily+%28ScienceDaily%3A+Latest+Science+News%29, (2011).

Wiggin, A., "Graphene: The "New Silicon"?", The Daily Reckoning, 3 pages, found at dailyreckoning.com/graphene-the-new-silicon/, (2011).

Akhavan, O. et al., "Toxicity of graphene and graphene oxide nanowalls against bacteria", ACS Nano, vol. 4, No. 10, pp. 5731-5736, (2010).

Andrei, M., "New spin makes graphene magnetic", ZMEScience, 3 pages, found at www.zmescience.com/science/physics/graphene-transistor-16042011/, (2011).

Zimmer, L., "New graphene super paper is 10x stronger than steel", Inhabitat—Sustainable Design Innovation, Eco Architecture, Green Building, 3 pages, found at inhabitat.com/new-graphene-super-paper-is-10x-stronger-than-steel/, (2011).

Cole, G.D., "Magnesium", Chemical & Engineering News, 2 pages, found at pubs.acs.org/cen/80th/magnesium.html, (2003).

Dikin, D.A. et al., "Preparation and characterization of graphene oxide paper", Nature, vol. 448, pp. 457-460, (2007).

Nuvoli, D. et al., "High concentration few-layer graphene sheets obtained by liquid phase exfoliation of graphite in ionic liquid", Journal of Materials Chemistry, vol. 21, pp. 3428-3431, (2011).

Nuvoli, D. et al., "High concentration few-layer graphene sheets obtained by liquid phase exfoliation of graphite in ionic liquid", Journal of Materials Chemistry, Supplementary Material, vol. 21, 3 pages, (2011).

Herron, C.R. et al., "Simple and scalable route for the "bottom-up" synthesis of few-layer graphene platelets and thin films", Journal of Materials Chemistry, vol. 21, pp. 3378-3383, (2011).

Herron, C.R. et al., "Simple and scalable route for the "bottom-up" synthesis of few-layer graphene platelets and thin films", Journal of Materials Chemistry, Supplementary Material, vol. 21, 3 pages, (2011).

Liu, H. et al., "Chemical doping of graphene", Journal of Materials Chemistry, vol. 21, No. 10, pp. 3335-3345, (2011).

(56) References Cited

OTHER PUBLICATIONS

Yan, X. et al., "Solution-chemistry approach to graphene nanostructures", Journal of Materials Chemistry, vol. 21, No. 10, pp. 3295-3300, (2011).
Inagaki, M. et al., "Graphene: preparation and structural perfection", Journal of Materials Chemistry, vol. 21, No. 10, pp. 3280-3294, (2011).
Driscoll, J.A., "A demonstration of burning magnesium and dry ice", Journal of Chemical Education, vol. 55, No. 7, pp. 450-451, (1978).
"Graphene nanoribbon interconnect resistivity comparable to copper", MRS Bulletin, vol. 34, p. 556, (2009).
The Physics arXlv Blog, "First demonstration of inkjet-printed graphene electronics", Technology Review, 2 pages, found at www.technologyreview.com/blog/arxiv/27368/?nlid=nldly&nld=2011-11-29, (2011).
"Berkeley lab scientists control light scattering in graphene", e! Science News, 4 pages, found at esciencenews.com/articles/2011/03/16/berkeley.lab.scientists.control.light.scattering.graphene, (2011).
"Record achieved for high-speed graphene transistors", Materials Research Society, 1 page, printed on Nov. 28, 2011.
High Temperature Physics, "Graphenes and other Nano-Materials from Gases and Seawater", High Temperature Physics, LLC, 1 page, found at www.hightempphysics.com/technology.html, printed on Aug. 18, 2011.
Novoselov, K.S. et al., "Two-dimensional gas of massless Dirac fermions in graphene", Nature, vol. 438, pp. 197-200, (2005).
Rao, C.N.R. et al., "Graphene, the new nanocarbon", Journal of Materials Chemistry, vol. 19, pp. 2457-2469, (2009).
Schedin, F. et al., "Detection of individual gas molecules adsorbed on graphene", Nature Materials, vol. 6, pp. 652-655, (2007).
Sakhaee-Pour, A. et al., "Potential application of single-layered graphene sheet as strain sensor", Solid State Communications, vol. 147, pp. 336-340, (2008).
Son, Y-W. et al., "Half-metallic graphene nanoribbons", Nature Letters, vol. 444, pp. 347-349, (2006).
Stankovich, S. et al., "Graphene-based composite materials", Nature Letters, vol. 442, pp. 282-286, (2006).
Park, S. et al., "Chemical methods for the production of graphenes", Nature Nanotechnology, vol. 4, pp. 217-224, (2009).
Takamura, T. et al., "Identification of nano-sized holes by TEM in the graphene layer of graphite and the high rate discharge capability of Li-ion battery anodes", Electrochimica Acta, vol. 53, pp. 1055-1061, (2007).
Hu, W. et al., "Graphene-based antibacterial paper", ACS Nano, vol. 4, No. 7, pp. 4317-4323, (2010).
Wang, G. et al., "Facile synthesis and characterization of graphene nanosheets", The Journal of Physical Chemistry C, vol. 112, pp. 8192-8195, (2008).
Guo, H-L. et al., "A green approach to the synthesis of graphene nanosheets", ACS Nano, vol. 3, No. 9, pp. 2653-2659, (2009).
Kim, C-D. et al., "Preparation of graphene sheets by the reduction of carbon monoxide", Carbon, vol. 47, pp. 1605-1612, (2009).
Shafirovich, E.Y. et al., "Magnesium and carbon dioxide: A rocket propellant for Mars missions", Journal of Propulsion and Power, vol. 9, No. 2, pp. 197-204, (1993).
Li, W. et al., "Metallic magnesium nano/mesoscale structures: Their shape-controlled preparation and Mg/air battery applications", Angewandte Chemie International Edition, vol. 45, pp. 6009-6012, (2006).
Li, W. et al., "Magnesium nanowires: Enhanced kinetics for hydrogen absorption and desorption", Journal of the American Chemical Society, vol. 129, No. 21, pp. 6710-6711, (2007).
Ferrari, A.C. et al., "Raman spectrum of graphene and graphene layers", Physical Review Letters, vol. 97, pp. 187401-1-187401-4, (2006).
Gupta, A. et al., "Raman scattering from high-frequency phonons in supported n-graphene layer films", Nano Letters, vol. 6, No. 12, pp. 2667-2673, (2006).
Ferrari, A.C., "Raman spectroscopy of graphene and graphite: Disorder, electron-phonon coupling, doping and nonadiabatic effects", Solid State Communications, vol. 143, pp. 47-57, (2007).
Ni, Z. et al., "Raman spectroscopy and imaging of graphene", Nano Research, vol. 1, pp. 273-291, (2008).
Casiraghi, C. et al., "Raman spectroscopy of graphene edges", Nano Letters, vol. 9, No. 4, pp. 1433-1441, (2009).
Chen, J-H. et al., "Defect scattering in graphene", Physical Review Letters, vol. 102, pp. 236805-1-236805-4, (2009).
International Search Report and written opinion dated Jul. 13, 2012 for PCT application No. PCT/US2011/063548.
Heersche, H.B. et al., "Bipolar supercurrent in graphene", Nature Letters, vol. 446, pp. 56-59, (2007).
Gierak, A., "Preparation of carbon and carbon-mineral adsorbents and their application in technique, environmental protection and chemical analysis", Polish Journal of Environmental Studies, vol. 6, No. 3, pp. 5-15, (1997).
Albrecht, S. et al., "Igniting carbon dioxide snow. Luminescence when magnesium is burned in a block of carbon dioxide snow", Praxis Der Naturwissenschaften, Chemie, vol. 49, No. 1, p. 34, (2000).
"New technique opens a gap in graphene", Materials Research Society, 1 page, printed on Nov. 28, 2011.
Novoselov, K.S. et al., "Electric field effect in atomically thin carbon films", Science, vol. 306, pp. 666-669, (2004).
International Search Report and Written Opinion of the International Searching Authority for International Application No. PCT/US2011/063548, the International counterpart to the present application, mailed on Jul. 13, 2012.
International Preliminary Report on Patentability for International Application No. PCT/US2011/063548, the International counterpart to the present application, mailed on Mar. 20, 2014.
Office Action for European Application No. 11 806 019.3, the European counterpart to the present application, mailed on Jan. 5, 2015.
Office Action for Chinese Application No. 201180073354.3, the Chinese counterpart to the present application, mailed on May 15, 2015, with English translation.
Office Action for Japanese Application No. 2014-529696, the Japanese counterpart to the present application, mailed Aug. 24, 2015, with English translation.
Office Action for Chinese Application No. 201180073354.3, the Chinese counterpart to the present application, mailed on Jan. 13, 2016, with English translation.
Office Action for European Application No. 11 806 019.3, the European counterpart to the present application, mailed on Feb. 11, 2016.

\* cited by examiner

CRYSTALLINE GRAPHENE AND METHOD OF MAKING CRYSTALLINE GRAPHENE

CROSS-REFERENCE TO RELATED APPLICATION

The present application claims the benefit of U.S. Provisional Application 61/533,045, filed 9 Sep. 2011, the entire contents of which are hereby incorporated by reference, except where inconsistent with the present application.

BACKGROUND

Within the last few years, graphene has received special attention from the scientific world due to its unique mechanical, and electrical properties.[1-3] The widespread application of graphene is not just limited to the fields of sensors,[4-5] nanoelectronics,[6] composites,[7-8] hydrogen storage,[9] lithium-ion batteries,[10] but also shown promises in medicine as antibacterial materials.[11] The diversity of the technological applications of graphene materials drives the search for facile routes to produce graphenes in high yields. Recent research for synthesis of such materials involved either chemical or electrochemical reduction of exfoliated graphite oxide.[12,13] Most of these techniques require use of strong oxidizing agents, for example, $H_2SO_4/KMnO_4$. A recent report described the production of graphene via reduction of CO using $Al_2S_3$.[14] Nonetheless, a well-controlled large scale production protocol for graphene structures is still in a great demand.

Another disadvantage of syntheses of graphene is that the product produced is of low crystallinity. Most syntheses of graphene begin with graphite, then exfoliate the graphite by oxidation to graphite oxide, followed by reduction.[24] These "top-down" processes introduce extensive defects into each layer of graphene. A "bottom-up" synthesis of few-layer graphene also produced graphene showing poor crystallinity, as indicated by broad lines in the X-ray diffraction pattern.[25]

SUMMARY

In a first aspect, the present invention is a method of producing graphene, comprising forming a composition comprising magnesium and carbon, and isolating graphene from the composition.

In a second aspect, the present invention is a method of producing isolated graphene, comprising isolating graphene from a composition comprising graphene and magnesium.

In a third aspect, the present invention is isolated crystalline graphene.

In a fourth aspect, the present invention is a method of forming a graphene ink, comprising dispersing or suspending the isolated crystalline graphene into a liquid.

In a fifth aspect, the present invention is a graphene ink comprising crystalline graphene and a liquid.

In a sixth aspect, the present invention is a method of preparing an electronic device, comprising preparing the electronic device from the isolated crystalline graphene.

In a seventh aspect, the present invention is an electronic device, comprising the isolated crystalline graphene.

DEFINITIONS

The term "graphene" includes single-layer graphene and few-layer graphene. The term "few-layer" graphene includes graphene have 2-10 layers, preferably 3-7 layers. The term "graphene nanosheets" refers to graphene particles or crystallites having individual widths and lengths of at most 999 nm, more preferably at most 500 nm, most preferably at most 300 nm, including 450, 400, 350, 300, 250, 200, 150, 100 and 50 nm.

Figure 7:
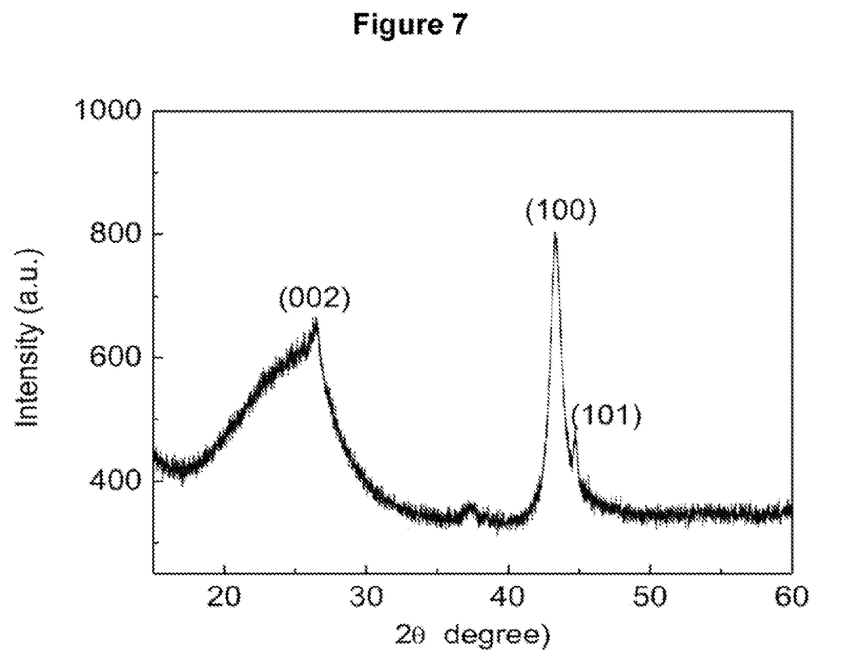
FIG. 7. XRD pattern of the carbon species.

The terms "crystalline graphene" and "crystalline few-layer graphene" refers to graphene and few-layer graphene, respectively, which has an X-ray diffraction pattern under $Cu_{K\alpha}$ radiation having a (100) peak with a full-width at half-maximum intensity which is at most 200% of the full-width at half-maximum intensity of the (100) peak illustrated in FIG. 7, more preferably at most 150% of the full-width at half-maximum intensity of the (100) peak illustrated in FIG. 7, most preferably 125% of the full-width at half-maximum intensity of the (100) peak illustrated in FIG. 7, including 130%, 125%, 120%, 115%, 110%, 105% and 100%. The graphene described in Herron et al. (ref. 25) is not crystalline graphene.

The term "isolated" means substantially freed from impurities, by-products and contaminants; the term "isolating" means to substantially free from impurities, by-products and contaminants.

The term "particle size" means the average diameter of the image of the particle as viewed by electron microscopy, unless otherwise stated. The term "average particle size" means the average of the particle sizes of a collection of particles.

BRIEF DESCRIPTION OF THE DRAWINGS

FIG. 5. TEM images of few-layer graphene. (a) Graphenes with an average length of 50-100 nm. (b) Crystalline graphenes with an average length of 200 nm.

DETAILED DESCRIPTION

The present invention is based on the discovery that carbon produced by burning magnesium in carbon dioxide, in contact with solid carbon dioxide (also referred to as dry ice), followed by washing with acid, produces crystalline graphene in high yield. Although this chemical reaction had previously been carried out, it was never recognized that the major product produced was graphene, which could be isolated by filtering a suspension of the reaction products through a filter. Unlike graphene produced by other methods, such as by exfoliation of graphite, the graphene is crystalline, and of a small particles size. By separating the products of the reaction by particle size, for example by filtration, the graphene could be isolated.

Thus, burning magnesium metal in a $CO_2$ environment produces carbon materials as shown in Equation 1. Although the metal-$CO_2$ propulsion system for Mars missions have been explored,[15] the conversion of $CO_2$ into solid nanostructured carbon materials has not been reported. Therefore, this approach involving combustion of magnesium metal in carbon dioxide to form few-layer graphene is unprecedented.

$$2Mg(s)+CO_2(g) \rightarrow 2MgO(s)+C(s) \quad (1)$$

The way the magnesium metal is introduced, in different shapes and forms, may be varied, as may be the experimental design. Other metals, such as transition metals including Zn, and alkaline and alkaline earth metals including Li, may also be included with the magnesium. Burning magnesium coils, spirals or ribbons inside a quartz-glass chamber filled with dry ice is another possible variation.

During the burning process, the magnesium may be in liquid form, and may form a molten mixture with added metals, such as transition metals including Zn, and alkaline and/or alkaline earth metals including Li. The graphene is isolated from the solidified mixture containing magnesium metal, magnesium oxide and/or magnesium carbonate, using acids, preferably an aqueous solution of an acid. Other carbon-containing gasses may be used to support the burning of the magnesium, such as carbon monoxide, or mixtures of carbon dioxide and carbon monoxide, and inert gases, such as argon, may be included. The presence of oxygen or oxygen-containing gases (such as $H_2O$) is also possible. It may also be possible to form liquid magnesium and introduce the carbon dioxide (or other carbon-containing gas) to allow chemical reaction, without the characteristic flame or self-sustaining nature of burning. It may also be possible to include carbon in the form of graphite or carbonate (such as magnesium carbonate) with the magnesium metal.

Preferably, the magnesium contains at most 1% impurity metals, such as calcium, more preferably at most 0.1%, and most preferably at most 0.01%. Preferably, salts of magnesium, such as magnesium chloride are not present, or are present in an amount of at most 1%, more preferably at most 0.1%, and most preferably at most 0.01%.

Various metals may be added to the magnesium prior to reaction with the carbon dioxide, for example alkali metals (such as Li), alkaline earth metals (such as Be or Ca), or other elements from the periodic table including transition metals, post-transition metals, and rare-earth metals (such as B, Al, Sc, Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt, Au, Hg, Th, Ce, Pr, Ga, In, Sn, Tl, Pb, La, Nd, Sm, Eu, Gd, Tb, Ho, Dy, Er, Tm, Yb, Lu, Bi, Ge and/or Si). Preferably, such added metals are present in an amount of at most 10 atomic percent, more preferably at most 5 atomic percent.

Not wishing to be bound by any particular theory, the preparation condition of the graphene may be described is different ways. For example the metal containing magnesium is in liquid form, and is therefore at a temperature above 650° C. and below a temperature of 1100° C., for example 650-1000° C., or 650-900° C., or 700-800° C. Carbon produced during the reaction may directly form graphene, or may dissolve in the liquid metal, and as the metal is consumed the carbon may precipitate as graphene, and/or the graphene may form upon cooling. Since the liquid metal is in contact with solid carbon dioxide, which has a temperature of −78.5° C., the molten metal cools very quickly as the reaction reaches completion, and in less than 10 seconds, less than 5 seconds, or less than 1 second or even less, the molten metal cools at least 1000° C., at least 800° C., or at least 700° C.; the graphene may form as the melt cools.

The graphene may be isolated by removing by-products produced during formation of the graphene. Magnesium metal, other metals which may be present, oxides and carbonates, may be removed by washing with water and/or aqueous acids. Carbon containing by products may be removed by sorting the material by particle size, for example by filtration, centrifugation and/or Pasteur separation. Repeated isolation steps, such as washing, filtration and/or centrifugation, may be performed until the desired purity is obtained. Different particle sizes of graphene may also be separated, for example by filtration with one or more filters of different pore sizes, for example 500 nm pores, 400 nm pores, 350 nm pores, 300 nm pores, 250 nm pores, 200 nm pores, 150 nm pores, 100 nm pores, and/or 50 nm pores. Anodized aluminum oxide filters of various sizes are commercially available, and may be easily prepared in almost any pore size. Preferably, the graphene is isolated by washing with acid followed by filtration to remove any graphite which may be present. Preferably, the isolated graphene contains less than 10% by weight of non-graphene material, more preferably less than 5% by weight of non-graphene material, including less than 4%, less than 3%, less than 2%, less than 1%, less than 0.5%, less than 0.1%, or even less than 0.05%, by weight, of non-graphene material.

Single-layer graphene may be prepared from the crystalline graphene. For example, the crystalline graphene may be exfoliated by placing the material between two pieces of sticky tape, and pulling apart the two pieces of tape; one or more layers of the crystalline graphene may stick to each piece of tape. Alternatively, the graphene may be suspended in a liquid, such as water or an organic solvent, and sonicated for an extended period of time[26]. The single-layer graphene may be selected by filtration or centrifugation, for example.

The graphene may be used as a solid or suspended to form a graphene dispersion (also referred to as a graphene ink). For example, a dispersion or suspension may be formed by mixing the graphene with water or an organic solvent and subjecting the mixture to sonication, mixing and/or milling[27]. The dispersion or suspension may then be printed or applied to a surface to form conducting wires or layers[26]. Transparent conductive films may be produced from the graphene by mixing the dispersion or suspension with a polymeric material. The procedures described in ref. 26 may be used to form graphene ink. The procedures described in ref. 28 may be used to form transparent conductive films, by substituting the crystalline graphene for carbon nanotubes. In this way, electronic device elements, such as electrical connection and touch screens may be formed. The electronic device elements may be incorporated into an electronic device such as an integrated circuit, a programmable logic device, a data communications device, a clock generation device, a display (such as a flexible display or a conductive display), a computer, an airplane, a mobile telephone or an automobile.

Results and Discussion

Figure 4:
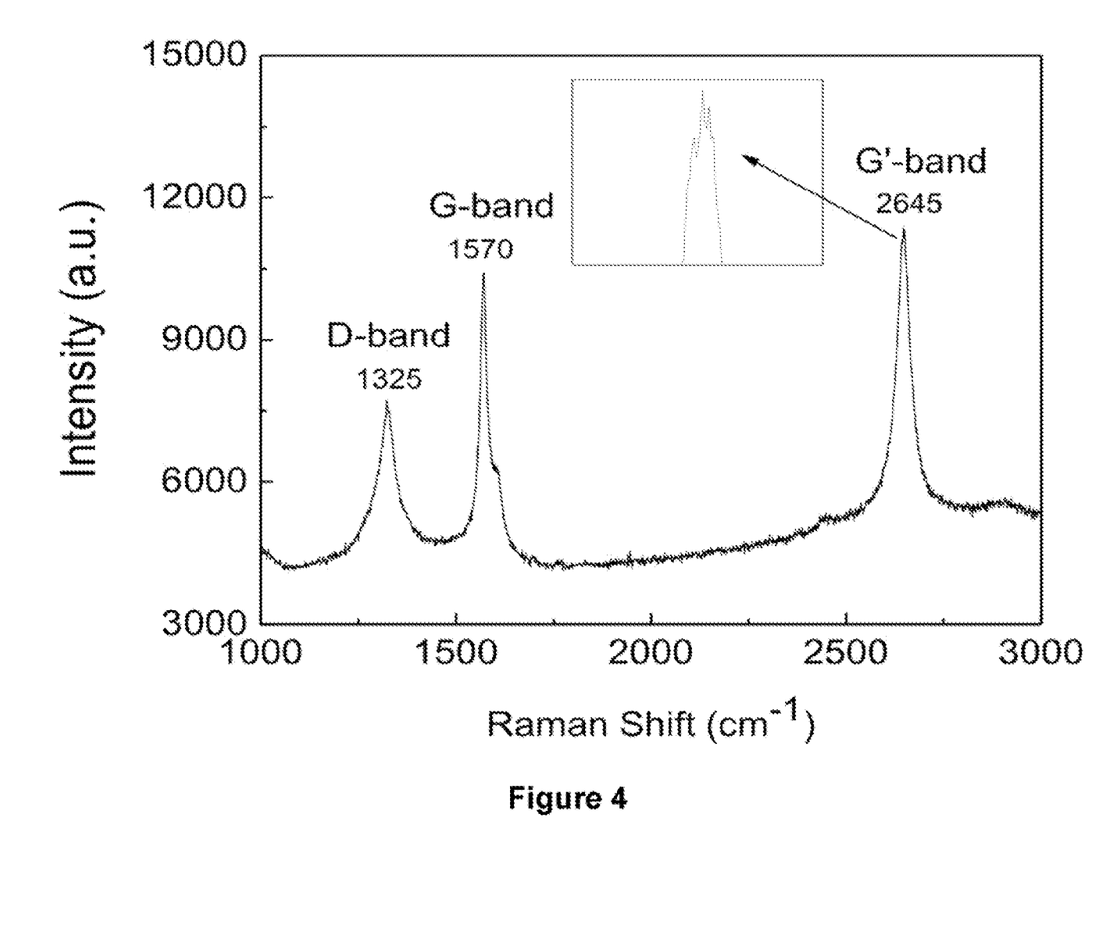
FIG. 4. 633 nm Raman Spectrum of the carbon species exhibiting the G'-band at 2645 $cm^{-1}$, G-band at 1570 $cm^{-1}$ and a D-band at 1325 $cm^{-1}$. Inset: the expanded view of the G'-band showing the splitting pattern of the peak.

Raman spectroscopy is considered to be an effective tool for characterization of mono or few-layer graphenes, and several theoretical and experimental studies have been reported recently.[18-22] Raman spectrum of the nanostructured carbon species obtained during our experiments is depicted in FIG. 4. The two major components of the spectrum consisted of peaks at 1570 $cm^{-1}$ and 2645 $cm^{-1}$, which are commonly designated as the G-band and the G'-band or 2D-band respectively. In a recent study on the structure of graphene, Ferrari et al. demonstrated clearly that the number of layers in a graphene structure can be revealed from the Raman peaks, and thus, graphite can be easily distinguished from graphenes.[18,20] The position and shape of the G' band in the Raman spectrum identify the presence and number of layers of the graphene structures respectively. With a 633 nm Raman spectrum, the G' band peak of graphene was found at about 2645 $cm^{-1}$,[18] which closely matches our finding as shown in FIG. 4. In the case of monolayer graphene, the G' band is a sharp single peak; while in the case of bi- or multi-layer graphenes, there are splittings generated either from the phonon branches or the electronic bands. The G' band shifted more towards 2700 cm$^{-1}$ in the case of graphenes with more than 7-10 layers, which is indistinguishable from graphite.[18] From the observed spectrum, splitting of the 2D band (inset of FIG. 4) and its position indicate that few-layer graphene is the majority of our product. Moreover, the peak intensities of the G-band and the G'-band are also related to the number of layers of the graphene structures. Gupta et al. compared the peak intensities of different layer structures of graphene and found that with the number of layers of five or more the G-band grows higher with respect to the intensity than that of the G'-band,[19] which again was a confirmation of our product to be few-layer graphene. The other band found in the spectrum is the D-band at 1325 cm$^{-1}$, which is of significantly lower intensity and represents some lattice defects present in the structure.[23]

Figure 5A:
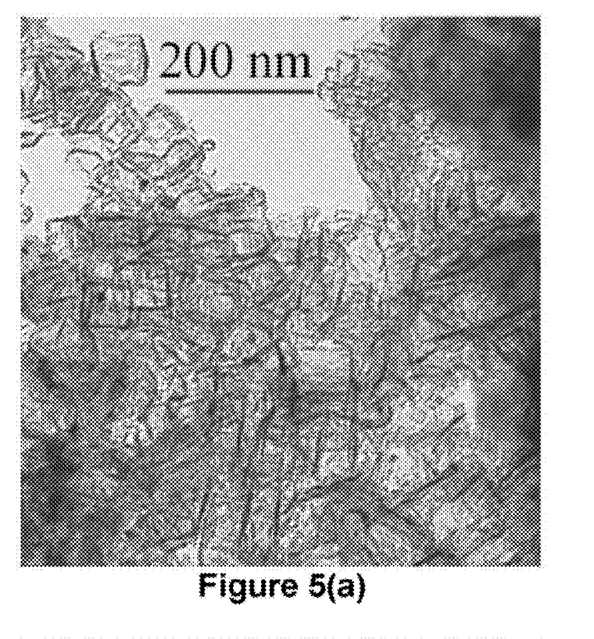
Figure 5B:
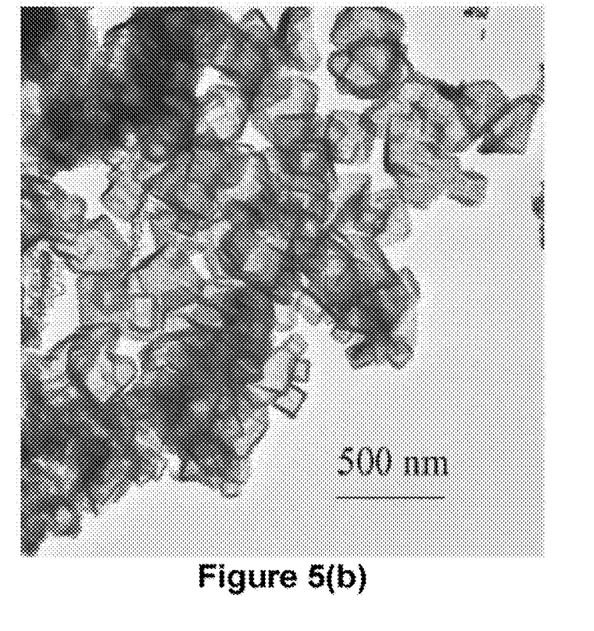
Figure 6:
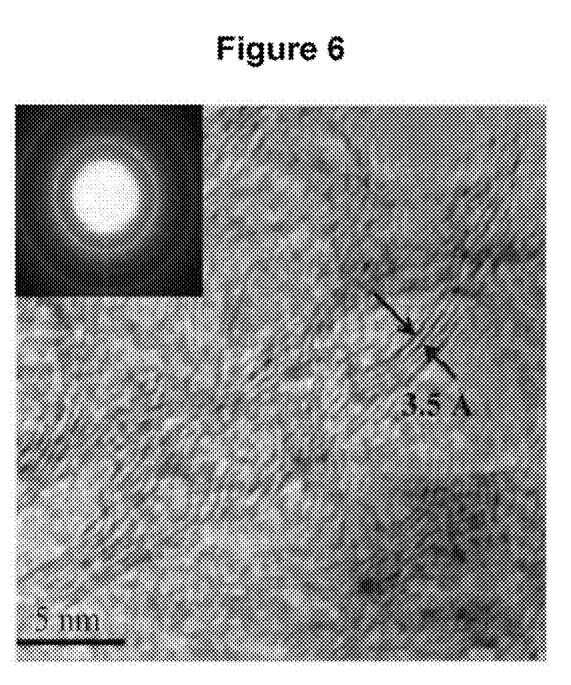
FIG. 6. High resolution TEM image of few-layer graphene exhibiting the number of layers to be between three and seven.

FIGS. 5(*a*) and (*b*) show TEM images of the few-layer graphene, prepared by our new method described above, in which graphene sheets with varying length between 50 nm and 300 nm are observed. The high-resolution TEM (FIG. 6) clearly exhibits the signature image of the few-layer graphene with the number of layers ranging from 3-7. The measured lattice space of this material is about 3.5 Å, which is in good agreement with the thickness of a mono-layered graphene (3.4 Å). The inset image in FIG. 6, corresponding to the diffraction pattern of few-layer graphene, is indicative of the crystallization.

Figure 8:
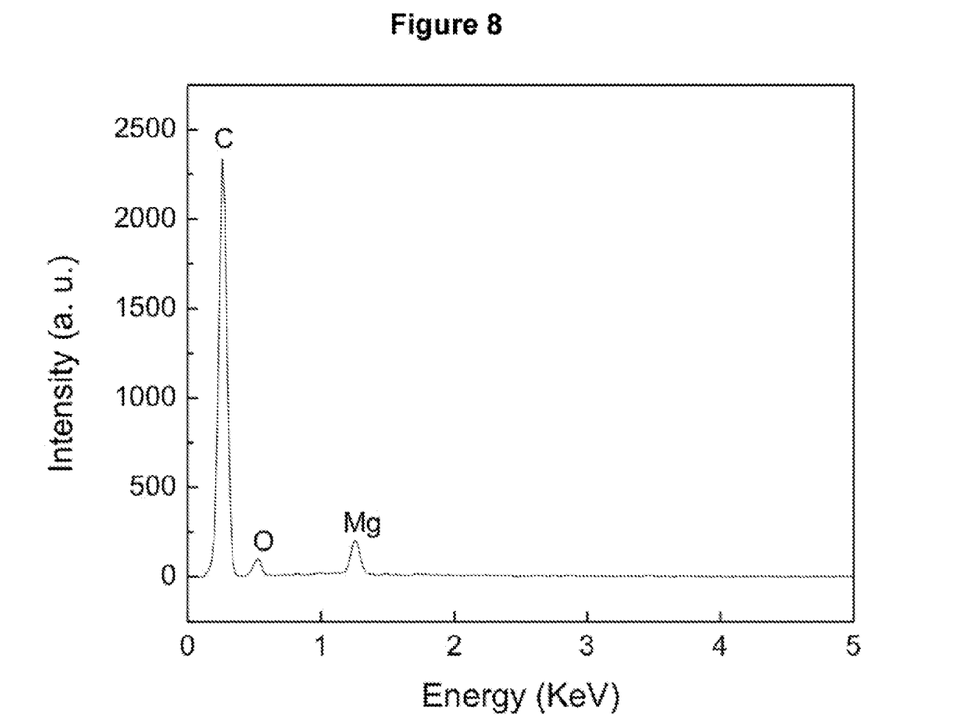
FIG. 8. EDX spectra of the graphene nanosheets, C 90.32 (Atm. %); Mg 2.38 (Atm. %); O 7.30 (Atm. %).

The X-ray diffraction pattern of our bulk product is shown in FIG. 7. The prominent (002) peak at 26.3 degrees is observed along with the (101) peak at 44.6 degree. The other characteristic peak for graphene structure is (100) peak located at 2θ of 43.2 degree, which is overlapped with one of MgO peaks. While we examined the purity of the product via EDX spectroscopy, the absence of any impurity other than a trace amount of Mg and O in the product was confirmed (FIG. 8). The trace amount of Mg (2.38 atomic weight percent) and O (7.30 atomic weight percent) is mainly due to the trapped MgO and some absorbed $O_2$. Therefore, the contribution of MgO to the peak at 2θ of 43.2 degree is small, and this peak can be readily assigned to (100) diffraction of graphenes.

Although the exact mechanism of the formation of graphene is still under investigation, the high temperature generated during the burning of magnesium metal likely plays a role. It is possible that the combustion of the solid magnesium in gaseous $CO_2$ favors the rapid flee of the solid product from the reaction center. As such, the retention time of the $sp^2$ carbon atoms in the reaction core may not be long enough to form graphite. Instead, only few-layer graphene is kinetically favored.

In conclusion, the current methodology produces few-layer graphene captured directly by igniting Mg in $CO_2$. The structure of few-layer graphene product was confirmed by TEM, Raman spectroscopy and XRD and they are all consistent with the data available in the literature. The synthetic process is cost effective and can be used to produce few-layer graphene in large quantities. Furthermore, the use of non-toxic chemicals and recyclable materials during the synthesis constitutes this work as part of green chemistry.

EXAMPLES

Mg metal of different forms and shapes was ignited in dry ice chambers covered with blocks or slabs of dry ice. Specifically, the following experiments were carried out.

Method 1: Several strips (about an inch long) of magnesium metal (5.0 g) were ignited inside a square block of dry ice. The typical dimension of a cubic hole dug into the dry ice box is approximately 2×2×2 inches. The yield is 90% (1.1 g) graphene materials.

Method 2: The Mg turnings (5.0 g) were ignited inside a dry ice block in a procedure identical to that described above, but it was covered with another block of dry ice. The yield of graphene materials, based on consumed Mg turnings, was 85% (1.05 g).

Method 3: The granular Mg turnings (5.0 g) were ignited inside a square block of dry ice with a 4×4×4 inches of deeper and wider hole. It has been observed that the granular Mg metal burns much faster than its turnings or strips to yield 83% (1.02 g) of the graphene product.

Method 4: This method involved the magnesium coils with an ending metal wick or fuse for ignition. While 5.0 g of Mg was ignited in this fashion, the flame lasted much longer to produce the graphene materials in higher yields (92%, 1.16 g) than from the methods 1-3 described above.

Method 5: Another technique was employed to ignite the magnesium metal where Mg strips (5.0 g) were placed along with dry ice shavings and its powder inside the hole that had been dug out in a block/slab of dry ice. About 1.10 g (90%) of the few-layer graphene was isolated from this method.

Method 6: In this method, the cubic holes were replaced by a series of channels that were carved on a solid slab or a long block of dry ice in which the Mg strips (5.0 g, 6-inch long) were ignited to obtain 1.11 g (90%) of few-layer graphene product.

Method 7: In a procedure identical to that described above in Method 1, the metal strips of zinc (Zn, 5.40 g) and Mg (2.0 g), in a molar ratio of 1:1, were ignited inside a dry ice cube. About 450 mg of few-layer graphene (91% yield) was obtained as the final product.

Method 8: In a procedure, identical to that described in Method 1, an equimolar mixture of lithium metal (Li, 1.13 g) and Mg metal (4.0 g) strips were ignited inside a dry ice cube. Extreme care was exercised in handling the more reactive lithium metal strips. Thus, the Li metal strips were cut inside a glove-box and then brought outside using argon filled vials. About 850 mg (86% yield) of few-layer graphene material was isolated from this process.

Figure 1:
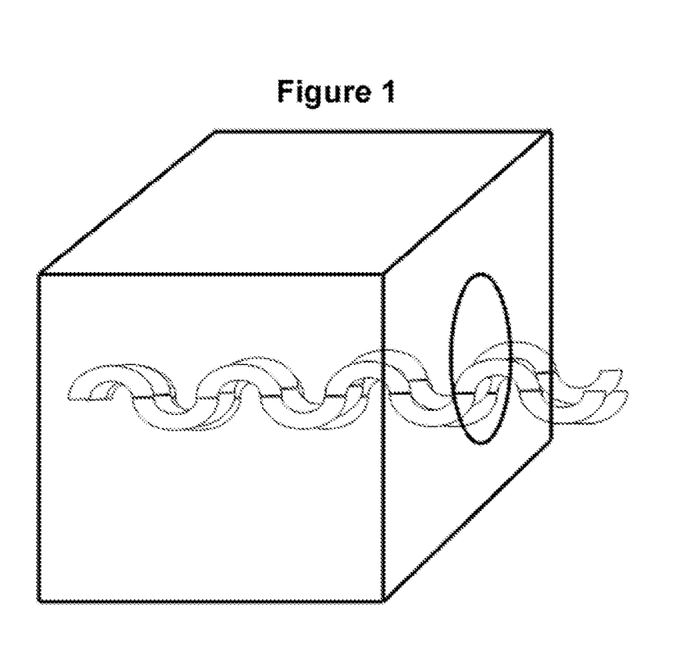
FIG. 1. Dry ice chamber with holes at both ends.

Method 9 (prophetic): This process uses a dry ice chamber with holes at both ends in order for Mg ribbons protrude out as in FIG. 1. This facilitates the ignition of the metal from both ends and hence faster redox reaction within the chamber containing dry ice.

Figure 2:
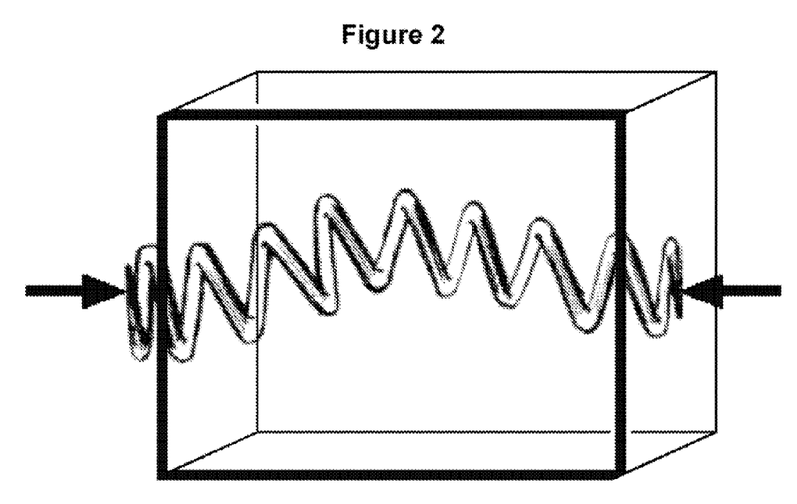
FIG. 2. Quartz-Glass Reaction Chamber for Ignition of Mg Spirals.

Method 10 (prophetic): A large-size Mg spiral will be placed in a quartz-glass reaction chamber with both ends of the metal protruding through holes located at the opposite ends as shown in FIG. 2. After filling the chamber with powdery dry ice, the Mg metal will be ignited at both ends simultaneously. For the safety purpose, the entire apparatus will be placed in a large metal container.

Method 11 (prophetic): In order to investigate the structural influence of Mg metal on the formation of graphene nanosheets, several forms of nanostructured Mg metal will be ignited inside the dry ice block as in Method 1. The known nanowires, nanorods and/or nanospheres of Mg metal will be prepared,[17] and then used subsequently.

Isolation Procedure

After completion of the reduction of $CO_2$ to carbon with concomitant oxidation of Mg to MgO, the black/white solid product mixture was slowly transferred into a large flask or beaker containing 100 mL of 3 M HCl that resulted in vigorous effervescence indicating that the residual and/or contaminated Mg metal and the white product MgO were reacting with HCl to produce water-soluble $MgCl_2$. This mixture was stirred over a period of 3.0 h at room temperature during which time no more effervescence was observed and that the white turbid mixture turned black indicating that the MgO has been completely converted into $MgCl_2$. At this point, the heterogeneous mixture was filtered, washed many times with 3M HCl and, finally, with de-ionized water until the pH of the filtrate turned to 7.0 indicating that no more washings were needed to remove the residual by-product MgO and HCl. The black residue, collected on the filter, was dried in vacuo and characterized for the presence of few-layer graphene.

Purification of Graphene Nanosheets from Bulk Materials

Figure 3:
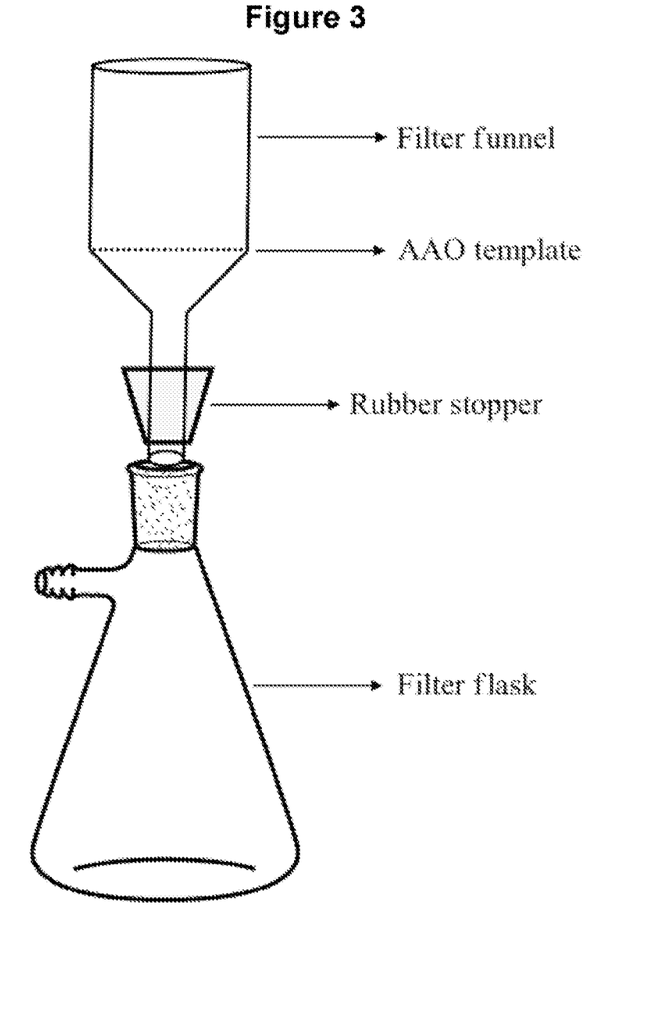
FIG. 3. Isolation of Graphene Using AAO Template.

A unique purification technique is employed to isolate graphene nanosheets from bulk product materials. The graphene nanosheets are typically within the dimension of 50-300 nm. An anodized aluminum oxide (AAO) template with a pore size of 100 nm to 300 nm was used as a filter to allow only the graphene nanosheets, while the bulk materials of larger sizes, including graphites, will remain on the filter. The experimental set up is depicted in FIG. 3.

The process involved dispersion of about 1 gram of graphene materials in 50 mL of deionized water via ultrasonication for 30 minutes. A specially designed filter funnel is used to mount the AAO disc. The discs are typically of 25 mm in diameter and can be placed on the hollow filter funnel. The funnel is fitted to a filter flask that is connected to a vacuum-line in order to ensure faster filtration. While vacuum is turned on, the sonicated aqueous graphene suspension is poured over the filter disc. Depending on the pore size of the chosen AAO disc for filtration, graphene materials of different dimensions are separated from the bulk materials. When a template of 100 nm pore size is used, graphene particles with dimension of 100 nm or less will pass through the filter and are collected in the filtrate, while rest of the materials will remain on the AAO disc. The water in the filtrate is evaporated to collect the product of a specific and desired size that will be dried further in vacuo to collect the crystalline form of few-layer graphene.

Using filter templates of larger pore sizes, pristine few-layer graphene materials with larger dimension can be separated in high yields from the bulk nanostructured carbon products.

REFERENCES

1. K. S. Novoselov, A. K. Geim, S. V. Morozov, D. Jiang, Y. Zhang, Y. S. V. Dubonos, I. V. Grigorieva and A. A. Firsov, *Science*, 2004, 306, 666;
2. K. S. Novoselov, A. K. Geim, S. V. Morozov, D. Jiang, M. I. Katsnelson, I. V. Grigorieva, S. V. Dubonos and A. A. Firsov, *Nature*, 2005, 438, 197.
3. C. N. R. Rao, K. Biswas, K. S. Subrahmanyam and A. Govindaraj, *J. Mater. Chem.*, 2009, 19, 2457.
4. F. Schedin, A. K. Geim, S. V. Morozov, E. M. Hill, P. Blake, M. I. Katsnelson and K. Novoselov, *Nat. Mater.*, 2007, 6, 652;
5. A. Sakhaee-Pour, M. T. Ahmadian and A. Vafai, *Solid State Commun.*, 2008, 147, 336.
6. Y. W. Son, M. L. Cohen and S. G. Louie, *Nature*, 2006, 444, 347.
7. S. Stankovich, D. A. Dikin, G. H. B. Dommett, K. M. Kohlhaas, E. J. Zimney, E. A. Stach, R. D. Pinen, S. T. Nguyen and R. S. Ruoff, *Nature*, 2006, 442, 282;
8. D. A. Dikin, S. Stankovich, E. J. Zimney, R. D. Piner, G. H. B. Dommett, G. Evmenenko, T. Nguyen, R. S. Ruoff, *Nature*, 2007, 448, 457.
9. K. S. Novoselov, D. Jiang, F. Schedin, T. J. Booth, V. V. Khotkevich, S. V. Morozov and A. K. Geim, *Proc. Natl. Acad. Sci. U.S.A.*, 2005, 102, 10451.
10. T. Takamura, K. Endo, L. Fu, Y. P. Wu, K. J. Lee and T. Matsumoto, *Eletrochim. Acta*, 2007, 53, 1055.
11. W. Hu, C. Peng, W. Luo, X. Li, D. Li, Q. Huang and C. Fan, *ACS Nano*, 2010, 4, 4317.
12. G. Wang, J. Yang, J. Park, X. Gou, B. Wang, H. Liu and J. Yao, *J. Phys. Chem. C*, 2008, 112, 8192; S. J. Park and R. S. Ruoff, *Nat. Nanotechnol.*, 2009, 4, 217;
13. H.-L. Guo, X.-F. Wang, Q.-Y. Qian, F.-B. Wang and X.-H. Xia, *ACS Nano*, 2009, 3, 2653.
14. C.-D. Kim, B.-K. Min and W.-S. Jung, *Carbon*, 2009, 47, 1605.
15. E. Y. Shafirovich, A. A. Shiryaev and U. I. Goldshleger, *J. Propul. Power*, 1993, 9, 197.
16. A. Chakrabarti, J. Lun, J. C. Skrabutenaus, T. Xu, Z. Xiao, J. A. Maguire, N. S. Hosmane, *J. Mater. Chem.*, 2011, 21, 9491.
17. (a) W. Li, C. Li, C. Zhou, H. Ma, J. Chen, *Angew. Chem. Int. Ed.* 2006, 45, 6009-6012. (b) W. Li, C. Li, H. Ma, J. Chen, *J. Am. Chem. Soc.*, 2007, 129, 6710-6711.
18. A. C. Ferrari, J. C. Meyer, V. Scardaci, C. Casiraghi, M. Lazzeri, F. Mauri, S. Piscanec, D. Jiang, K. S. Novoselov, S. Roth and A. K. Geim, *Phys. Rev. Lett.*, 2006, 97, 187401.
19. A. Gupta, G. Chen, P. Joshi, S. Tadigadapa and P. C. Eklund, *Nano Lett.*, 2006, 6, 2667.
20. A. C. Ferrari, *Solid State Commun.*, 2007, 143, 47.
21. Z. Ni, Y. Wang, T. Yu and Z. Shen, *Nano Res.*, 2008, 1, 273.
22. C. Casiraghi, A. Hartschuh, H. Qian, S. Piscanec, C. Georgi, A. Fasoli, K. S. Novoselov, D. M. Basko and A. C. Ferrari, *Nano Lett.*, 2009, 9, 1433.
23. J.-H. Chen, W. G. Cullen, C. Jang, M. S. Fuhrer and E. D. Williams, *Phys. Rev. Lett.*, 2009, 102, 236805.
24. M. Inagaki, Y. A. Kim and M. Endo, *J. Mater. Chem.*, 2011, 21, 3280.
25. C. R. Herron, K. S. Coleman, R. S. Edwards and B. G. Mendis, *J. Mater. Chem.*, 2011, 21, 3378.
26. F. Torrisi, T. Hasan, W. Wu, Z. Sun, A. Lombardo, T. Kulmala, G. W. Hshieh, S. J. Jung, F. Bonaccorso, P. J. Paul, D. P. Chu, A. C. Ferrari, arXiv:1111.4970v1 [cond-mat.mtrl-sci] (21 Nov. 2011).
27. E. S. Kirkor, A. D. Schricker and A. Scheeline, U.S. Pat. No. 7,097,788 (Aug. 29, 2006).
28. Z. Wu, Z. Chen, X. Du, J. M. Logan, J. Sippel, M. Nikolou, K. Kamaras, J. R. Reynolds, D. B. Tanner, A. F. Hebard, and A. G. Rinzler, *Science*, Vol. 305. no. 5688, 1273-1276 (27 Aug. 2004).
29. B. W. O. Dickinson, III, R. W. Dickinson, J. K. Myers, and O. D. Ousterhout, U.S. Patent Application Publication, Pub. No. US 2011/0256049 A1 (Oct. 20, 2011).

What is claimed is:

1. A method of producing isolated graphene, comprising isolating graphene from a composition comprising graphene and magnesium, wherein the isolated graphene contains less than 10% by weight of non-graphene material.

2. The method of claim 1, further comprising forming the composition by a process comprising burning magnesium metal in an atmosphere comprising carbon dioxide.

3. The method of claim 1, wherein the composition is formed in contact with solid carbon dioxide.

4. The method of claim 1, further comprising forming the composition by a process comprising reducing carbon dioxide with magnesium metal.

5. The method of claim 4, wherein forming the composition comprises producing molten metal comprising the magnesium.

6. The method of claim 1, wherein the composition further comprises at least one additional element.

7. The method of claim 6, wherein the at least one additional element comprises zinc.

8. The method of claim 1, wherein the isolating comprises removing from the graphene at least one of magnesium oxide, magnesium metal and carbon.

9. The method of claim 8, wherein the removing comprises washing with an aqueous solution of an acid, and filtering, to produce a filtrate comprising the graphene.

10. The method of claim 9, wherein the filtrate comprises graphene having an average particle size of at most 300 nm.

11. The method of claim 1, wherein the graphene is few-layer graphene.

12. The method of claim 1, wherein an X-ray diffraction pattern under $Cu_{K\alpha}$ radiation of the isolated graphene has a (100) peak with a full-width at half-maximum intensity which is at most 150% of the full-width at half-maximum intensity of the (100) peak illustrated in FIG. 7.

13. The method of claim 1, wherein the isolated graphene has an average particle size of at most 500 nm.

14. The method of claim 1, wherein the isolated graphene contains less than 5% by weight of non-graphene material.

15. The method of claim 1, wherein the isolated graphene has an average particle size of at most 500 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 150% of the full-width at half-maximum intensity of the (100) peak illustrated in FIG. 7.

16. The method of claim 1, wherein the isolated graphene is few layer graphene,
the isolated graphene has an average particle size of at most 300 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 125% of the full-width at half-maximum intensity of the (100) peak illustrated in FIG. 7.

17. The method of claim 1, further comprising forming the composition by a process comprising reducing carbon dioxide with magnesium metal,
wherein the isolated graphene is few layer graphene,
the isolated graphene has an average particle size of at most 300 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 125% of the full-width at half-maximum intensity of the (100) peak illustrated in FIG. 7.

18. A method of forming a graphene ink, comprising:
preparing isolated graphene by the method of claim 1, and
dispersing or suspending the isolated graphene into a liquid.

19. The method of claim 18, wherein the liquid comprises water,
the isolated graphene has an average particle size of at most 500 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 150% of the full-width at half-maximum intensity of the (100) peak illustrated in FIG. 7.

20. The method of claim 18, wherein the liquid comprises an organic liquid,
the isolated graphene has an average particle size of at most 500 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 150% of the full-width at half-maximum intensity of the (100) peak illustrated in FIG. 7.

21. The method of claim 18, wherein the isolated graphene is few layer graphene,
the isolated graphene has an average particle size of at most 300 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 125% of the full-width at half-maximum intensity of the (100) peak illustrated in FIG. 7.

22. A method of preparing an electronic device, comprising:
preparing isolated graphene by the method of claim 1, and
preparing the electronic device from the isolated graphene.

23. The method of claim 22, wherein the isolated graphene has an average particle size of at most 500 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 150% of the full-width at half-maximum intensity of the (100) peak illustrated in FIG. 7.

24. The method of claim 22, wherein the isolated graphene is few layer graphene,
the isolated graphene has an average particle size of at most 300 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 125% of the full-width at half-maximum intensity of the (100) peak illustrated in FIG. 7.

25. A method of preparing an electronic device, comprising:
forming isolated graphene by the method of claim 1,
dispersing or suspending the isolated graphene into a liquid, to form a graphene ink, and
preparing the electronic device from the graphene ink.

26. The method of claim 25, wherein the preparing comprises printing the graphene ink on a substrate.

27. The method of claim 25, wherein the liquid comprises water,
the isolated graphene has an average particle size of at most 500 nm,
the isolated graphene contains less than 5% by weight of non-graphene material, and
an X-ray diffraction pattern under $Cu_{K\alpha}$ radiation of the isolated graphene has a (100) peak with a full-width at half-maximum intensity which is at most 150% of the full-width at half-maximum intensity of the (100) peak illustrated in FIG. 7.

28. The method of claim 25, wherein the liquid comprises an organic liquid, the isolated graphene has an average particle size of at most 500 nm, the isolated graphene contains less than 5% by weight of non-graphene material, and an X-ray diffraction pattern under $Cu_{K\alpha}$ radiation of the isolated graphene has a (100) peak with a full-width at half-maximum intensity which is at most 150% of the full-width at half-maximum intensity of the (100) peak illustrated in FIG. 7.

29. The method of claim 25, wherein the isolated graphene is few layer graphene, the isolated graphene has an average particle size of at most 300 nm, the isolated graphene contains less than 5% by weight of non-graphene material, and an X-ray diffraction pattern under $Cu_{K\alpha}$ radiation of the isolated graphene has a (100) peak with a full-width at half-maximum intensity which is at most 125% of the full-width at half-maximum intensity of the (100) peak illustrated in FIG. 7.

30. A method of producing isolated graphene, comprising:

reducing carbon dioxide with molten metal, the molten metal comprising magnesium, to form a composition comprising graphene and magnesium oxide, isolating graphene from the composition, to form isolated crystalline graphene, wherein the isolated crystalline graphene has an average particle size of at most 500 nm, and the isolated crystalline graphene contains less than 5% by weight of non-graphene material.

31. A method of producing isolated graphene, comprising isolating graphene from a composition comprising graphene, magnesium and at least one additional element, wherein the at least one additional element comprises zinc.

* * * * *